US009521597B2

United States Patent
Göransson et al.

(10) Patent No.: US 9,521,597 B2
(45) Date of Patent: Dec. 13, 2016

(54) SYSTEM AND METHOD OF SUPPORTING SOFTER HANDOVER IN A CELL USING ADAPTIVE ANTENNA IN ENABLING NARROW BEAM OPERATION

(75) Inventors: Bo Göransson, Sollentuna (SE); Bo Hagerman, Tyresö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 491 days.

(21) Appl. No.: 12/282,590

(22) PCT Filed: Aug. 30, 2006

(86) PCT No.: PCT/SE2006/000995
§ 371 (c)(1),
(2), (4) Date: Sep. 11, 2008

(87) PCT Pub. No.: WO2007/106000
PCT Pub. Date: Sep. 20, 2007

(65) Prior Publication Data
US 2009/0098874 A1 Apr. 16, 2009

Related U.S. Application Data

(60) Provisional application No. 60/781,366, filed on Mar. 13, 2006.

(51) Int. Cl.
*H04W 36/00* (2009.01)
*H04W 72/04* (2009.01)
(Continued)

(52) U.S. Cl.
CPC ....... *H04W 36/0083* (2013.01); *H04W 72/046* (2013.01); *H04W 16/28* (2013.01);
(Continued)

(58) Field of Classification Search
CPC .. H04W 16/28; H04W 36/0083; H04W 36/30; H04W 72/046; H04W 36/0055; H04W 36/0088; H04W 36/08; H04W 36/0094; H04W 72/0413; H04B 7/0408; H04B 7/0617; H04B 7/0695; H04B 7/088
(Continued)

(56) References Cited

U.S. PATENT DOCUMENTS 5,933,787 A * 8/1999 Gilhousen et al. ............ 455/438
6,259,918 B1 * 7/2001 Labonte et al. ............... 455/437
(Continued)

FOREIGN PATENT DOCUMENTS

EP 1 418 780 A1 5/2004
WO WO 9903304 A1 7/1999
(Continued)

OTHER PUBLICATIONS

Ericsson. Correction to Not Mention Flexible hard Split Support Indicator IE in Procedure Text. 3GPP Draft; R3-041498. Nov. 11, 2004.
(Continued)

*Primary Examiner* — Olumide T Ajibade Akonai
(74) *Attorney, Agent, or Firm* — Patent Portfolio Builders, PLLC

(57) ABSTRACT

Handover is a main function that is used to support mobility in the network. In a cellular communication network having adaptive antennas for enabling narrow beam operation, a network control unit sends a radio link setup request to a selected cell-serving network unit for configuration of a new serving radio link. Before responding to the radio link setup request the cell-serving network unit performs uplink measurements with respect to the mobile unit, and a narrow target beam is selected within a cell served by the cell-serving network unit based on these measurements. The cell-serving network unit then configures the new serving radio link for the considered mobile unit directly with the selected narrow target beam. Consequently the system can perform the handover procedure using narrow beams only, without first establishing the radio link with a cell-wide beam and then reconfiguring the radio link onto a narrow beam.

20 Claims, 11 Drawing Sheets

(51) Int. Cl.
　　*H04W 36/30*　　(2009.01)
　　*H04W 72/12*　　(2009.01)
　　*H04W 16/28*　　(2009.01)

(52) U.S. Cl.
　　CPC ........ *H04W 36/0094* (2013.01); *H04W 36/30*
　　(2013.01); *H04W 72/0413* (2013.01); *H04W 72/1231* (2013.01)

(58) Field of Classification Search
　　USPC .......... 455/439, 437, 436–444, 452.2, 562.1; 370/331, 334
　　See application file for complete search history.

(56) References Cited

U.S. PATENT DOCUMENTS

| | | | |
|---|---|---|---|
| 6,415,149 B1* | 7/2002 | Bevan et al. ................. | 455/442 |
| 7,970,348 B2* | 6/2011 | Hagerman ............ | H04W 16/28 370/203 |
| 2004/0063430 A1* | 4/2004 | Cave et al. .................. | 455/436 |
| 2004/0102203 A1* | 5/2004 | Tiirola et al. ................. | 455/515 |
| 2004/0218569 A1* | 11/2004 | Pedersen et al. ............. | 370/334 |
| 2005/0070285 A1 | 3/2005 | Goransson | |
| 2006/0073850 A1* | 4/2006 | Cha ...................... | H04B 7/0608 455/562.1 |

FOREIGN PATENT DOCUMENTS

| | | |
|---|---|---|
| WO | WO 00/51367 A2 | 8/2000 |
| WO | WO 00/51368 A2 | 8/2000 |

OTHER PUBLICATIONS

3GPP. 3$^{rd}$ Generation Partnership Project; Technical Specification Group Radio Access Network; UTRAN Iub Interface Node B Application Part (NBAP) Signalling (Release 5). 3GPP TS 25.433 v5.13.0 (Jun. 2005).

3GPP. 3$^{rd}$ Generation Partnership Project; Technical Specification Radio Access Network; Physical Layer—Measurements (FDD) (Release 5). 3GPP TS 25.215 v5.7.0 (Jun. 2005).

* cited by examiner

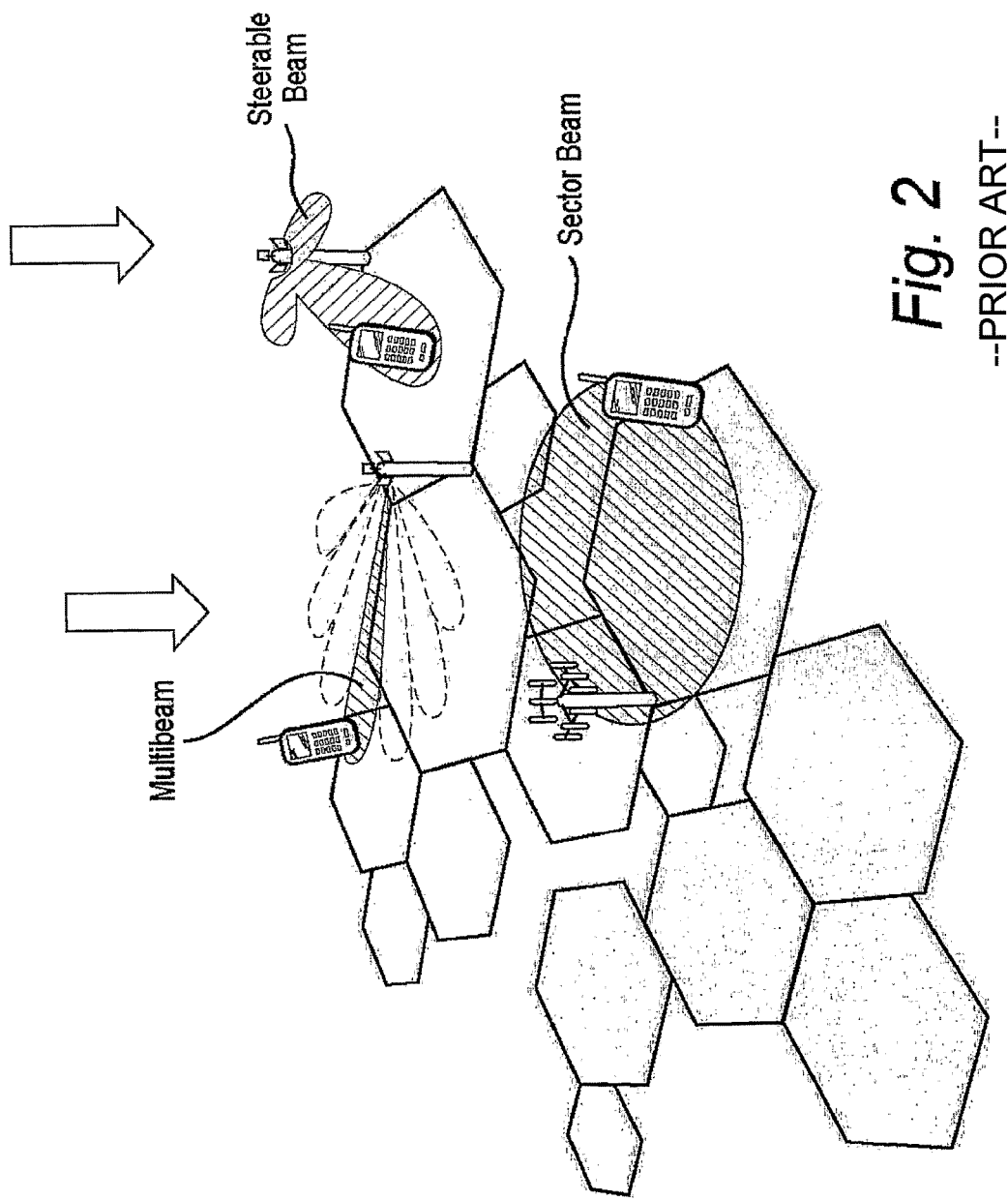
Fig. 2 --PRIOR ART--

SYSTEM AND METHOD OF SUPPORTING SOFTER HANDOVER IN A CELL USING ADAPTIVE ANTENNA IN ENABLING NARROW BEAM OPERATION

This application claims the benefit of US Provisional Application Ser. No. 60/781,366, filed Mar. 13, 2006, the disclosure of which is fully incorporated herein by reference.

TECHNICAL FIELD

The present invention generally relates to wireless or cellular communication and more particularly to narrow beam handover for adaptive antennas.

BACKGROUND

The use of adaptive or smart antennas is considered as one of the key features for increasing coverage and capacity of a wireless system such as WCDMA. When beamforming is applied in the base station several narrow beams, compared to the sector/cell beam, may be created to maintain coverage in the cell. FIG. 1A illustrates a sector cell antenna beam. Although a sector antenna is useful to communicate broadcast and/or control information to all mobiles in the sector cell, an adaptive antenna may be used to transmit and receive in narrow beams covering just a part of the sector cell. FIG. 1B shows an example of a narrow antenna beam. FIG. 2 illustrates an example of a cellular network with a base station transmitting a sector beam, a base station transmitting one of the possible beams in a multi-beam system, and a base station transmitting a steerable beam. Some benefits of adaptive antennas are shown in FIG. 3, where a narrow beam of the adaptive antenna may be directed to an intended mobile and therefore spreads less interference in the download or downlink direction. The narrow beam also suppresses spatial interference from adjacent cell interferers in the uplink direction. Both factors increase the signal-to-interference gain, and therefore increase the overall system performance. Currently there exist no commercial installations of adaptive antennas in the field of WCDMA systems.

Another fundamental feature in a cellular network is handover (HO). Handover is a main function that is used to support mobility in the network. When a user is moving in the cellular network, it has to change serving cell when the signal from the current cell is too weak to support the current radio link. Also, in e.g. WCDMA there is a soft handover (SHO) functionality. This means that there may exist several radio links between the user terminal and the network. This has the effect that the combination of several radio links together may provide sufficient quality of the combined radio link set.

When narrow beams are created by the smart antenna system, the user equipment (UE) needs to make a handover between the different beams in order to maintain the call. In order to make these handovers, a reference (or pilot) signal measurement is used to decide upon the quality of a specific base station antenna beam.

However, when adaptive antennas and handover are combined in wireless networks such as WCDMA certain problem arises. In many systems, e.g. WCDMA, a common pilot signal is used as a reference for the handover measurements. This reference should be transmitted in the whole cell (defining the cell coverage), as specified by 3GPP standards. Hence the reference is common for an entire cell and may thus constitute a poor reference for the quality in specific beams when beamforming is applied. Furthermore, when performing a handover, the narrow beams of the adjacent cells are not known to the mobile, hence the handover needs to be carried out on sector covering wide beams.

In reference [1], downlink quality measurements associated with a broadcast signal transmission from neighboring base stations are detected by the mobile and reported to the radio network. First, a target base station is determined based on the measurements, and a radio link is established between the target base station and the mobile using the cell-wide broadcast signal. Subsequently, a desired antenna beam is determined using uplink measurements, and the radio link is then re-configured to the desired antenna beam. This means that after establishing a radio link, the link needs to be re-configured onto a narrow beam. When a new handover should be performed, each radio link must first be re-configured to a sector-wide beam again. This process will not only consume resources in the network for signaling, but will also lower the capacity since some radio links are transmitted over a wide sector beam instead of a high gain narrow beam.

There is thus a general need to improve the handover function in wireless systems when adaptive antennas and/or beamforming is applied.

SUMMARY

The present invention overcomes these and other drawbacks of the prior art arrangements.

It is a general object of the present invention to improve handover in wireless cellular systems using adaptive antennas for beamforming.

It is an object to improve the possibility to secure and more fully exploit the system capacity/coverage potential offered by narrow beam/adaptive antenna techniques.

In particular it is desirable to facilitate the handover function to allow for direct handover from/to narrow beams, and narrow beam to narrow beam without the need to back off and transmit over the entire cell at handover.

Briefly, the problem when adaptive antenna (AA) technology is deployed is that the common reference signal specified by standards covers the whole cell, while the beam pattern formed by the AA system will cover parts of the cell only.

A basic idea of the invention is to provide efficient support for handover in a cellular radio communication system by using the handover protocol suite combined with measurements in a non-conventional way. The communication system has (adaptive) antennas for enabling narrow beam operation, and it is assumed that a mobile unit is served by an active cell set of at least one cell in the cellular communication system. In accordance with the invention, a network control unit sends a radio link setup request to a selected cell-serving network unit for configuration of a new serving radio link, and before responding to the radio link setup request the cell-serving network unit performs uplink measurements with respect to the mobile unit for selection of a narrow target beam within a cell served by the cell-serving network unit. The cell-serving network unit then configures the new serving radio link for the considered mobile unit directly with the selected narrow target beam.

In this way, the system can perform the handover procedure using narrow beams only, without first establishing the radio link with a cell-wide beam and then reconfiguring the radio link onto a narrow beam.

Preferably, the cell-serving network unit sends information, e.g. in a radio link setup response, representative of the selected narrow target beam to the network control unit.

The active cell set may include one or more active cells, and the neighbor area may include one or more neighbor cells.

The invention also relates to a network unit in a cellular radio communication system. The network unit preferably comprises a module for receiving a radio link setup request from a network control unit for configuration of a new serving radio link for a selected mobile unit. It also comprises a module for performing, before responding to the radio link setup request, uplink measurements with respect to the mobile unit for selection of a narrow target beam within a cell served by the network unit. The network unit can then configure the new serving radio link directly with the selected narrow target beam.

The invention offers the following advantages:
Improved handover for adaptive antennas.
Improved exploration of potential system capacity/coverage gains.

Other advantages offered by the invention will be appreciated when reading the below description of embodiments of the invention.

BRIEF DESCRIPTION OF DRAWINGS

FIG. 2 illustrates an example of a cellular network with a base station transmitting a sector beam, a base station transmitting one of the possible beams in a multi-beam system, and a base station transmitting a steerable beam.

DETAILED DESCRIPTION

For a better understanding of the invention, it may be useful to begin with a brief overview and analysis of the prior art techniques.

In WCDMA, for example, the handover measurements and signaling is always based on the Primary Common PIlot CHannel, P-CPICH, which is the basis for all measurements in the system. This signal, which is a unique sequence in each cell, is measured by all terminals in the system. It can be argued that this is the signal that defines a cell in a WCDMA system. Since this signal needs to be the same in the whole cell, certain problems arise when several narrow beams are used to cover a cell, e.g. when beamforming is applied in the system. For example, the handover mechanism is based on quality measurements on the P-CPICH. The UE is constantly measuring the quality of the pilot from neighboring cells, and this is reported to the radio network controller (RNC). The RNC then decide to add a link from a certain cell to the active set if certain requirements are fulfilled, e.g. the quality of the pilot signal is above a certain threshold. Also, when the quality of a pilot signal drop below a certain limit, this radio link is dropped. In this way, the UE can maintain a radio connection when it travels through the cellular layout of a system.

Figure 1A:
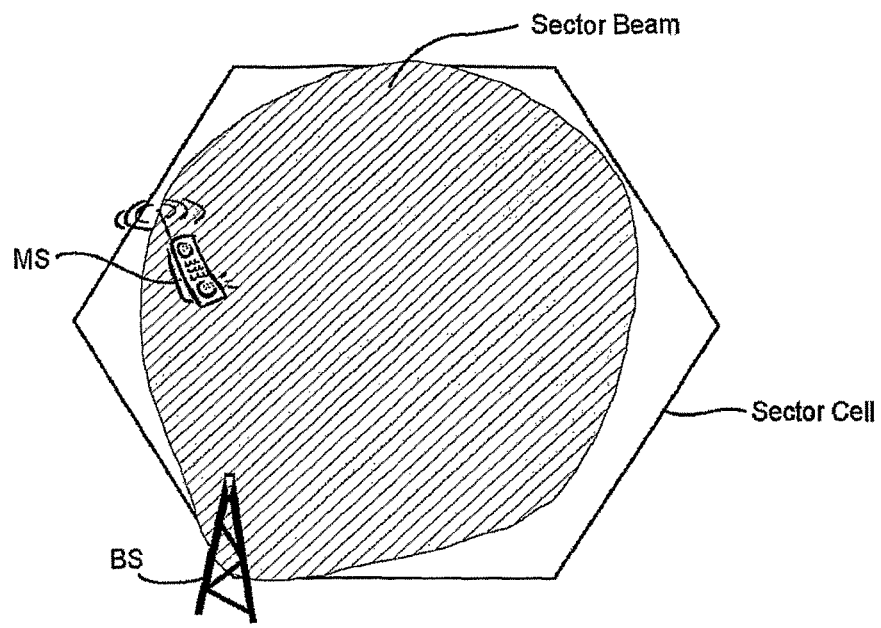
FIG. 1A illustrates a sector cell antenna beam.
Figure 1B:
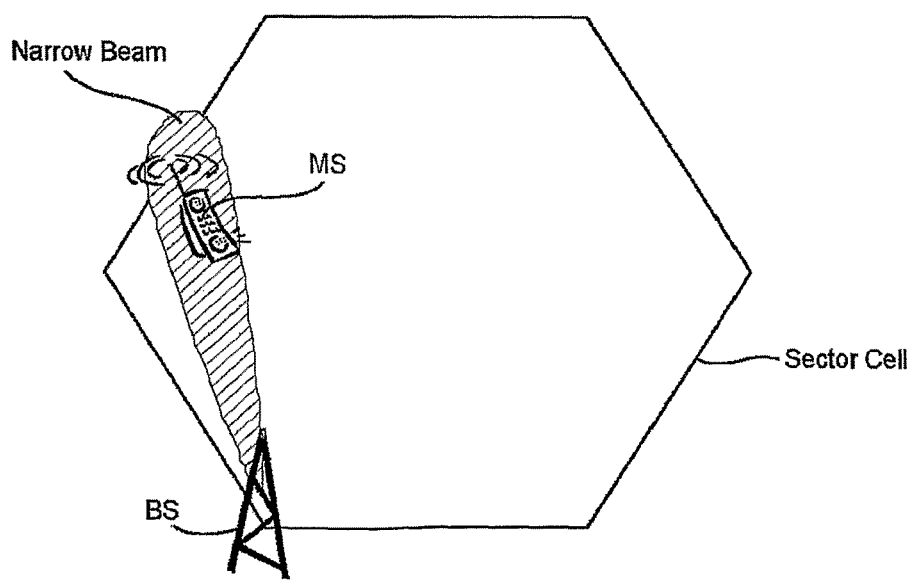
FIG. 1B shows an example of a narrow antenna beam.
Figure 3:
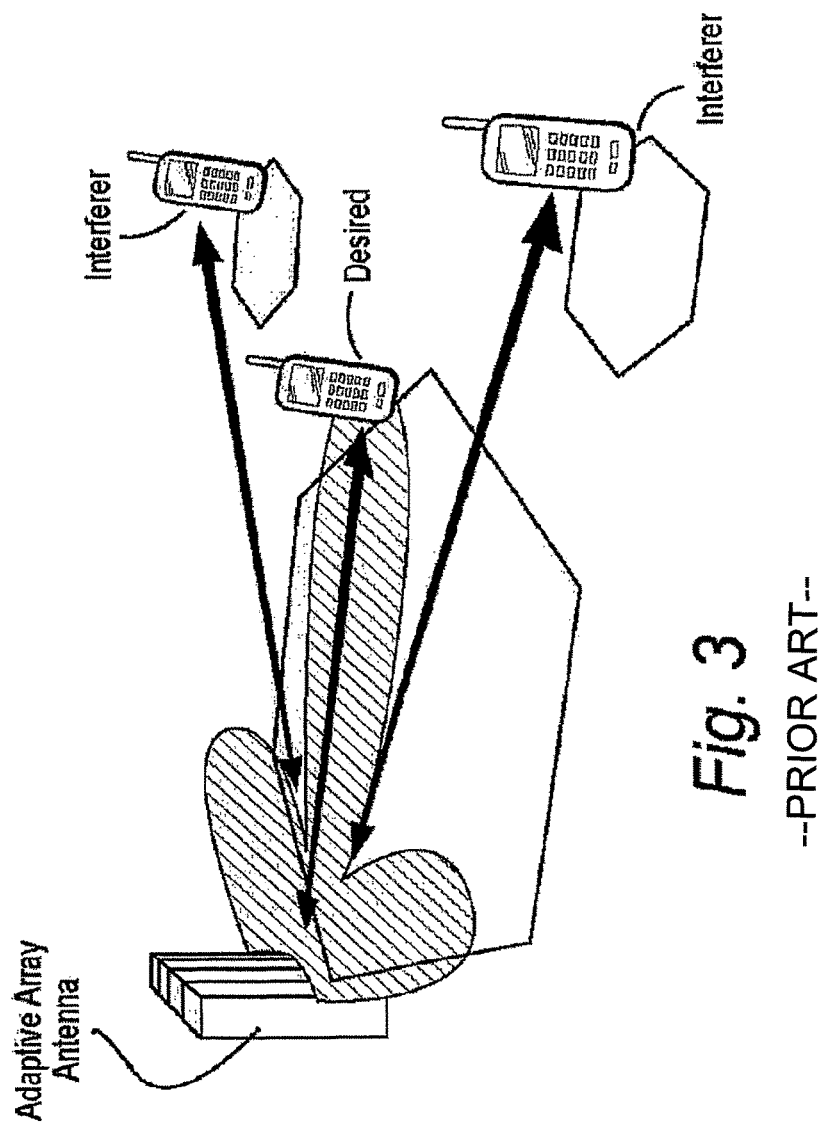
FIG. 3 illustrates how a narrow beam of an adaptive antenna may be directed to an intended mobile and therefore spreads less interference in the download or downlink direction.
Figure 4:
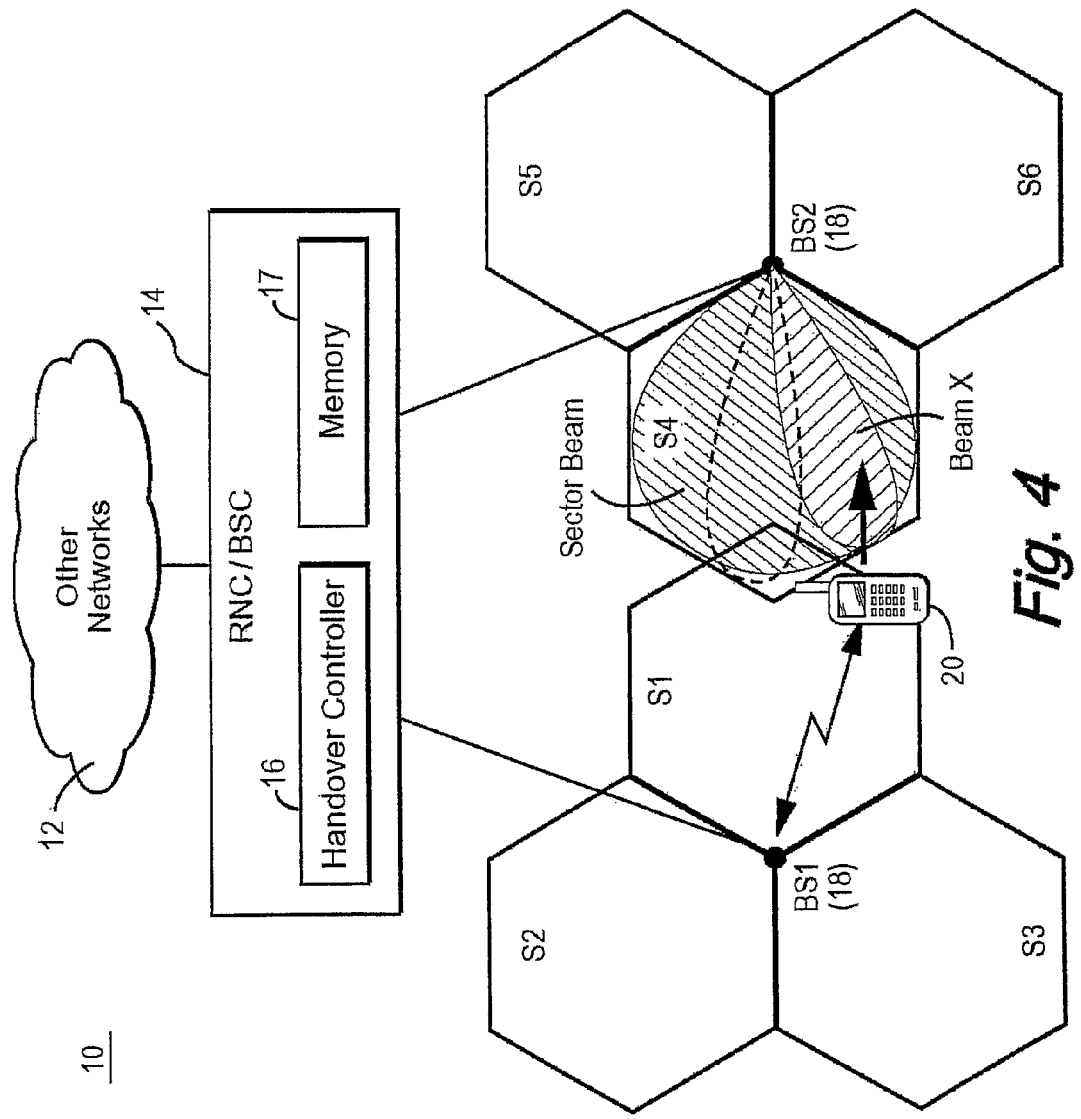
FIG. 4 illustrates an example of a radio communication system that includes a radio network controller/base station controller coupled to representative base stations.

FIG. 4 illustrates an example of a radio communication system 10 that includes a radio network controller (RNC)/base station controller (BSC) 14 coupled to representative base stations 18 (BS1 and BS2). The RNC/BSC 14 may also be coupled to one or more other networks 12. The RNC/BSC includes among other things a handover controller 16 and a memory 17 for storing, e.g. signal quality information used in handover decision making procedures. Base station BS1 divides its coverage into three representative sectors S1, S2, S3. Base station BS2 similarly divides its coverage into three representative sectors S4, S5, S6. Each sector has one or more antennas. In the example of FIG. 4, at least base station BS2 includes one or more adaptive antennas, and sector S4 includes a sector beam antenna for broadcasting common information such as a pilot signal. Other cell-wide signals may also be employed. An example of a pilot signal is the primary CPICH signal. Sector S4 may also include a multi-beam and/or steerable beam antenna such that one or more narrow beams may be directed to a particular portion of the sector cell. A mobile station 20 has an active radio link with base station BS1 and is moving toward a portion of sector S4 of base station BS2 covered by narrow antenna beam X. The movement prompts a handover to sector S4.

It has been recognized that the primary problem when beamforming is deployed in a conventional WCDMA system is how to manage the handovers. Since the mobile or UE receives the radio link through a narrow beam, the channel quality of which may be very different from the quality of a sector covering P-CPICH, the handover measurements made by the UE on the P-CPICH may not reflect the quality that the UE experiences with transmission over the narrow beam. In this case a radio link that is below the threshold when measured on the P-CPICH may be dropped even if the quality on the narrow beam is above the threshold. Another problem that arises when beamforming is used is that the prior art systems cannot handle inter/intra cell beam handovers in an efficient way. Since all handover measurements are based on the P-CPICH, the quality of each beam cannot be monitored by the UE.

This problem is alleviated to some extent for the intra cell case by measurements performed by the base station per user in each cell portion of a given cell as introduced in later revisions of the 3GPP standard of reference [2]. However, it is not possible to use these measurements for handover from one cell to another cell due to limitations in the 3GPP standard.

Figure 5:
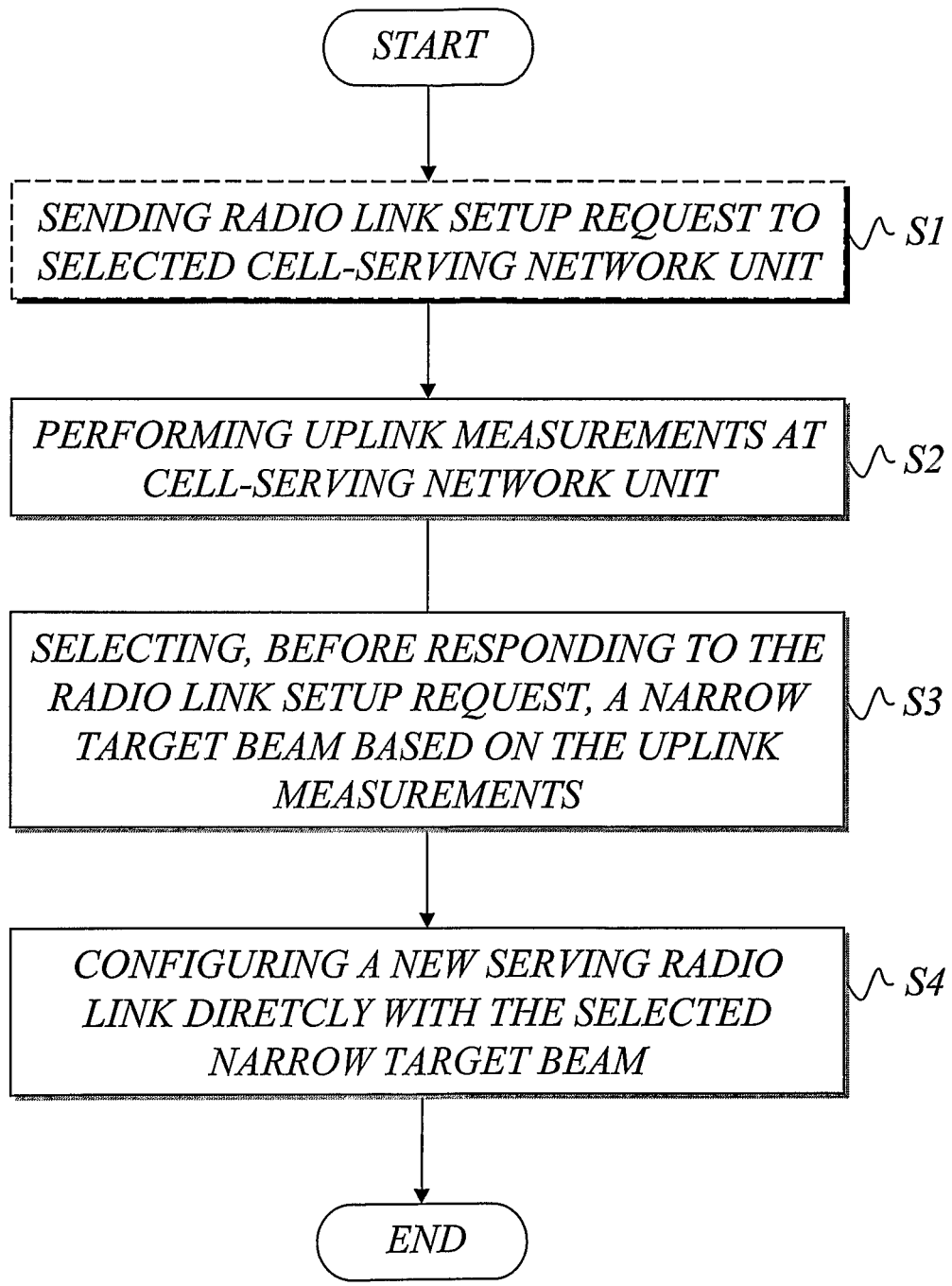
FIG. 5 is a schematic flow diagram of a preferred exemplary method for supporting handover in a cellular radio communication system having adaptive antennas for enabling narrow beam operation.

The invention proposes a completely new solution based on using the handover protocol suite combined with measurements in a non-conventional way. The communication system has (adaptive) antennas for enabling narrow beam operation, and it is assumed that a mobile unit is served by an active cell set of at least one cell in the cellular communication system. With reference to the exemplary flow diagram of FIG. 5, a network control unit sends (S1) a radio link setup request to a selected cell-serving network unit for configuration of a new serving radio link. Before responding to the radio link setup request the cell-serving network unit performs uplink measurements (S2) with respect to the mobile unit, and a narrow target beam is selected (S3) within a cell served by the cell-serving network unit based on these measurements. The cell-serving network unit then configures (S4) the new serving radio link for the considered mobile unit directly with the selected narrow target beam.

Consequently the system can perform the handover procedure using narrow beams only, without first establishing the radio link with a cell-wide beam and then reconfiguring the radio link onto a narrow beam.

In a sense, the radio link setup request can be regarded as incomplete with respect to the setup of the new serving radio link, and information about the selected narrow target beam thus constitutes complementary information for the final setup of the new radio link directly with the selected narrow target beam.

Preferably, the cell-serving network unit also sends information representative of the selected narrow target beam to the network control unit. Advantageously, the standard protocol suite is modified in an exemplary embodiment by appending information representative of the selected narrow target beam to the conventional radio link setup response.

It should be understood that the network control unit of the invention can be any suitable network control unit known to the art such as a radio network controller, a mobility server and an access gateway. Similarly, the cell-serving network unit of the invention can also be any known cell-serving network unit such as a radio access node, a radio base station and a Node B.

In the following, the invention will be described with reference to the particular examples of FIGS. 6-9. Although the invention will primarily be described with reference to W-CDMA systems, the invention is generally applicable to handover in cellular radio communication systems.

Figure 6:
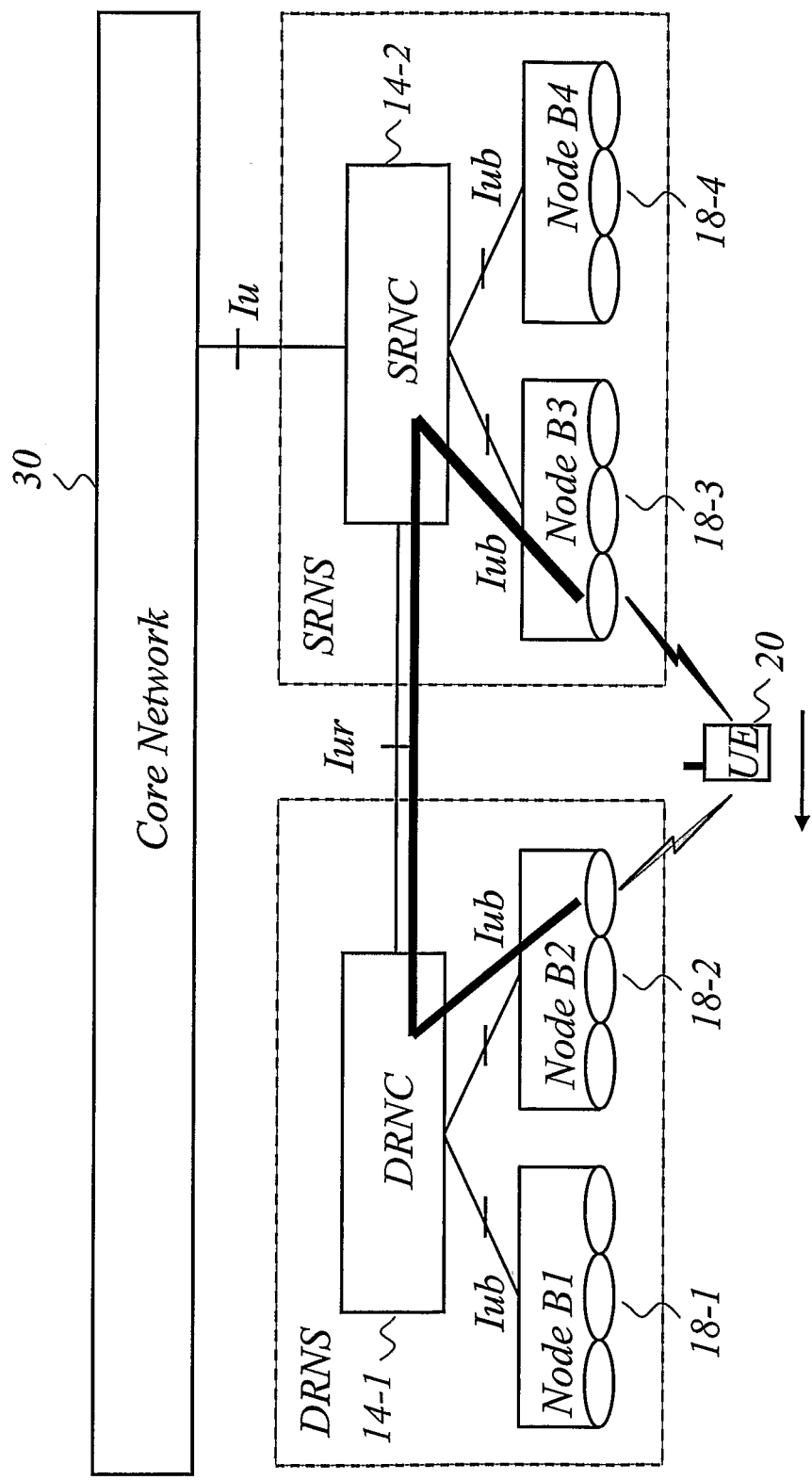
FIG. 6 is a schematic exemplary block diagram illustrating the different nodes involved when adding a radio link, for the exemplary case of inter-RNC handover.

FIG. 6 is a schematic block diagram illustrating the different nodes involved when adding a radio link, for the exemplary case of inter-RNC handover. Those familiar with UMTS Radio Access Network (UTRAN) and W-CDMA will recognize that the schematics of FIG. 6 correspond to the basic UTRAN architecture having a core network 30, a drift radio network subsystem with a drift RNC (DRNC) 14-1 and associated Node Bs 18-1 and 18-2, and a serving radio network subsystem with a serving RNC (SRNC) 14-2 and associated Node Bs 18-3 and 18-4. In this example, the UE 20 has a radio link with Node B3 18-3 and as the UE moves in the cellular architecture, the system reaction is to add a radio link with Node B2 18-2. In general, for each mobile or UE, one RNC is responsible—the serving RNC (SRNC), and if the UE moves to a cell controlled by a different RNC, that RNC becomes the drift RNC (DRNC), although the main control stays with the SRNC. Naturally, the SRNC may relocate control to DRNC and then the former DRNC becomes the new SRNC.

When the system should perform a handover (HO), the radio network controller (RNC) will issue a Radio Link Setup Request to the NodeB (base station in WCDMA terminology) [2]. This message contains general information on how the new radio link should be configured in the NodeB, but according to the 3GPP and other relevant standards the RNC has no narrow beam handover information at this point. According to the invention it is proposed that, before responding to this message, the NodeB should measure and determine the "best" cell portion (3GPP terminology for narrow beam) according to [3] or any other proprietary developed measurement. The Node B can then use the result of this measurement to configure the new serving radio link for the considered mobile unit/user equipment directly onto a narrow target beam. It is of course advantageous to select the best cell portion/narrow beam, or at least a target beam among the best narrow beams, according to any suitable traditional quality criterion (e.g. based on SNR, CIR or similar quality measure). When responding to the request, the NodeB will preferably append the result of this measurement (selection) procedure to the standardized Radio Link Setup Response message from NodeB to the RNC. It is possible to use existing information entities such as a "cell portion field" for this signaling. The RNC is adapted to interpret this information correctly so that it can forward the appropriate information of the radio link configuration to the considered mobile unit.

For so-called downlink coherent detection schemes a phase reference is required that has experienced the same propagation channel as the transmitted payload transmission. For this reason WCDMA supports Secondary Common Pilot Channels, S-CPICHs, where each of these reference signals can be associated to a narrow beam (cell portion in the 3GPP nomenclature) transmission. The inventors have recognized the possibility to use the S-CPICH field of the radio link setup response or similar existing field to provide information on the cell portion that corresponds to the selected narrow target beam. With a mapping of cell portions to corresponding narrow target beams, the RNC or equivalent network control unit can efficiently translate the cell portion information to a narrow target beam.

The RNC (more generally a network control unit) may inform the mobile unit that the new serving radio link is associated with a selected Node B (more generally a cell-serving network unit) and also with a reference signal related to the selected narrow target beam. According to the standards of today, the message from the (S)RNC to the UE (mobile) does not include any information on selected narrow target beam, but rather includes information on the pilot (S-CPICH) to be used for phase reference "associated" to a narrow beam or cell portion. However, as an option suggested by the invention, it is possible that future revisions of the standards may include information directly corresponding to a cell portion or narrow beam so that the network control unit may inform the mobile unit that the new serving radio link is associated with a selected cell-serving network unit and a selected narrow target beam.

The state-of-the art solution simply consists in adding, to the Active Set, the cell that corresponds to the P-CPICH whose measure triggered the Handover command. In case this target cell is equipped with narrow Fixed Beams (narrow multi-beams), the new link must, according to the standard, be established with the cell-wide beam that carries P-CPICH. Only upon completion of the Soft Handover procedure, the RNC is able to initiate Physical Channel Reconfiguration onto a proper narrow beam.

The prior art solution thus requires that the addition of the proper beam is always completed after:
1. completion of the soft handover procedure towards the new cell (wide beam); and
2. completion of the subsequent beam-switch procedure on the target cell.

In the following, the above conventional two-step procedure will be referred to as "wide beam handover".

According to the invention, the new serving radio link can be established directly with the selected target beam. In other words, the proposed solution referred to as "narrow beam handover" means that the addition of the proper beam is completed after completion of the handover procedure towards the new cell and narrow beam. This is in clear contrast to the prior art, where the radio link first has to be established with a cell-wide beam and then reconfigured onto a narrow beam.

Advantages of the proposed new procedure include:
Reduced delay of the addition of the new narrow beam link (no two-phase procedure).
Reduced interference on the target cell wide beam (which is an important limiting factor for the capacity enhancement provided by Fixed Beam antenna solutions).

Figure 7:
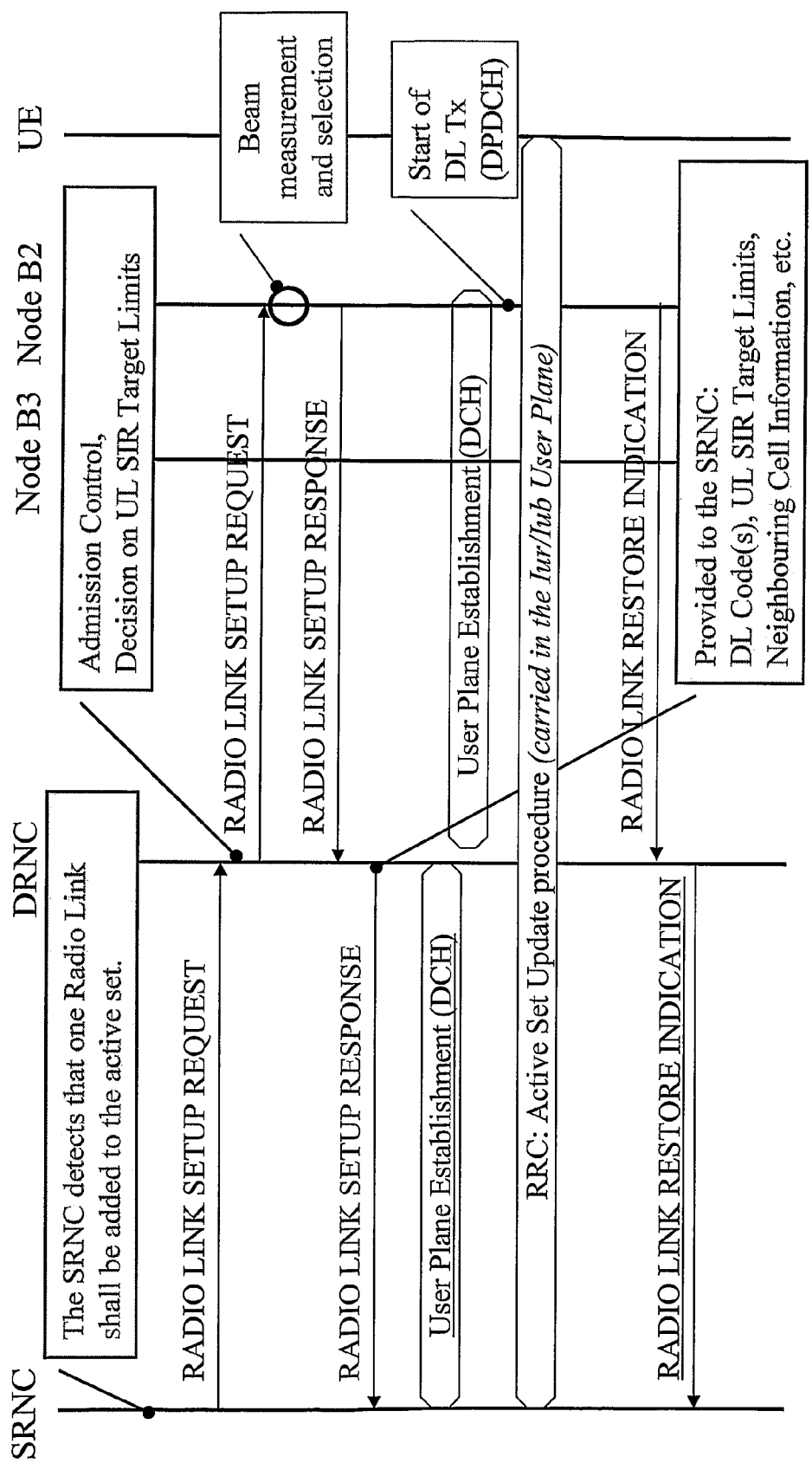
FIGS. 7-8 are schematic signal and sequence diagrams illustrating an exemplary handover procedure indicating narrow beam measurement and selection before responding to the radio link setup request.
Figure 8:
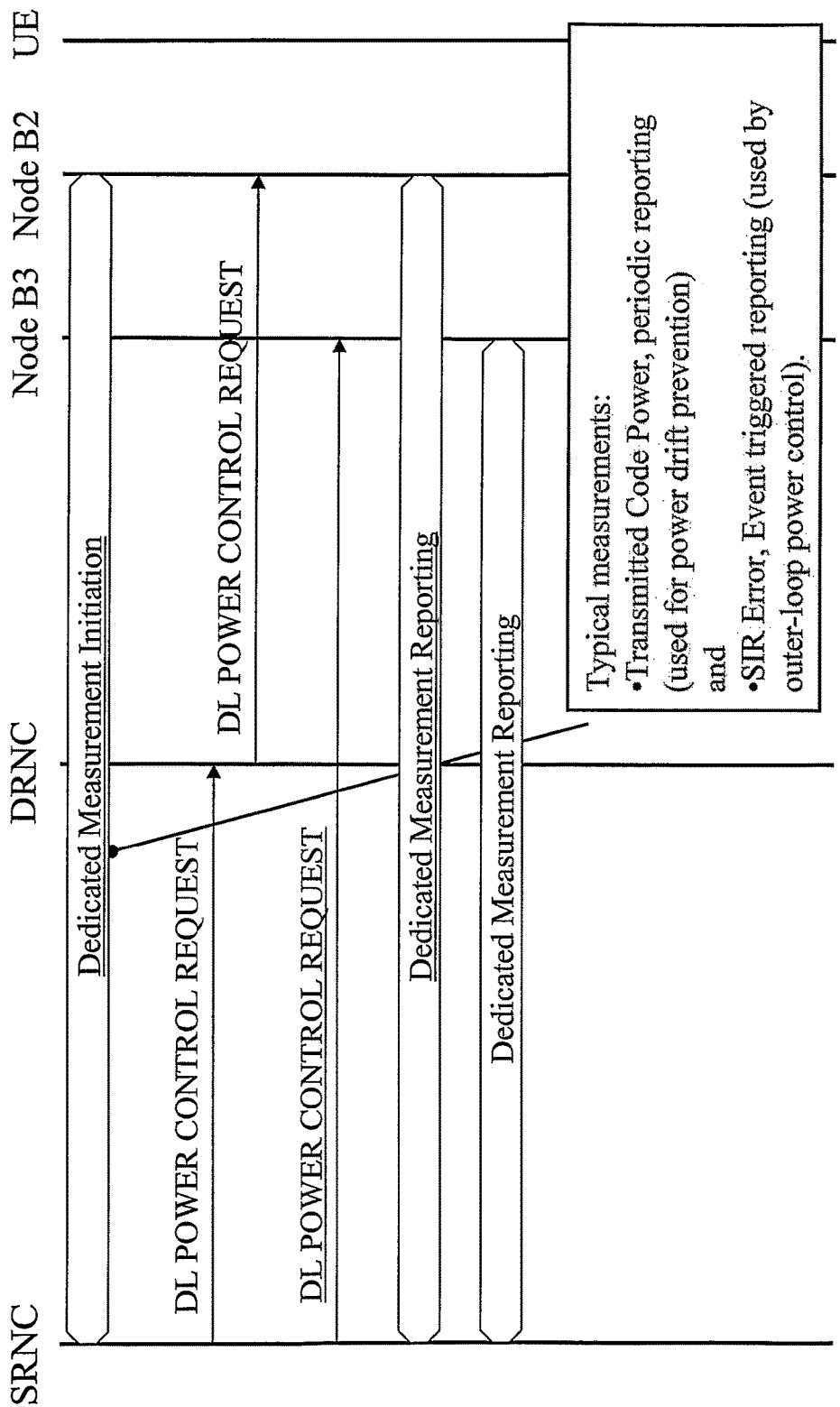

An exemplary novel procedure of "narrow beam handover", proposed as a part of the present invention, includes measurements and selection of a target beam within a target cell before responding to the radio link setup response, as indicated in the signal and sequence diagrams of FIGS. 7-8, where FIG. 8 illustrates a continuation of the sequence of FIG. 7.

The handover mechanism is conventionally based on quality measurements on the P-CPICH. The UE is constantly measuring the quality of the pilot from neighboring cells, and this is reported to the radio network controller (RNC). The RNC is communicating to the UEs information on which neighbors to monitor via a limited size neighbor list. From the P-CPICH measurements reported for the neighbor list, the RNC or similar network unit may decide to add a link from a certain cell to the active set if certain requirements are fulfilled, e.g. the quality of the pilot signal is above a certain threshold. Also the opposite, when the quality of a pilot signal drop below a certain limit, this radio link is dropped. In this way, the UE can maintain a radio connection when it travels through the cellular layout of a system.

Based on the current active cell set, the RNC may thus select a target cell (and corresponding node B) from the P-CPICH measurements reported for the neighbor list.

With reference to FIGS. 7-8, the SNRC detects that a radio link should be added to the active set. The SNRC sends a so-called RADIO LINK SETUP REQUEST to the DRNC. The DRNC basically performs admission control to see if there are any available radio resources. If the requested resources are available, the DRNC sends the RADIO LINK SETUP REQUEST to the relevant node B (node B2 in this example) and also decides on a set of control parameters such as uplink (UL) SIR target limits. According to the invention, Node B2 performs narrow beam measurements with respect to the considered mobile unit/user equipment (UE) and selects or determines a suitable narrow target beam (e.g. the beam with the best quality). Node B2 then allocates the requested resources, allocating a radio link directly with the selected narrow target beam, and reports successful radio resource allocation in a RADIO LINK SETUP RESPONSE to the DRNC. Preferably, the response message includes information of the selected narrow target beam, e.g. by using the S-CPICH field. The Node B starts uplink (UL) reception. The DRNC sends the RADIO LINK SETUP RESPONSE back to the SRNC. Among other things, the SRNC then initiates user plane establishment, which normally involves setup of an Iur/Iub or equivalent data transport bearer and binding to the Dedicated Channel (DCH). Then Node B starts downlink (DL) transmission. The Radio Resource Control (RRC) Active Set Update procedure is then initiated, normally meaning that the SRNC sends a new Active Set Update message to the UE and the UE acknowledges with an Active Set Update Complete message. When Node B achieves uplink synchronization on the Uu interface, it may notify the DRNC with a RADIO LINK RESTORE INDICATION message. The DRNC may in turn notify the SRNC.

According to the standards, the Radio Resource Control (RRC) functionality also controls the items to be measured in the radio interface including the measurement period, timing and reporting method by the UE. Measurement Initiation is a conventional procedure for setting measurement functions of the UE, and Measurement Reporting is a conventional procedure for the UE to forward measurement results to the network. The RRC also handles power control, and the downlink power control procedure (including sending downlink (DL) power control requests to the relevant node Bs) can be initiated by the SRNC any time after establishment of a radio link.

The place to add the indication of "best beam" is indicated in FIG. 7. Note also that the proposed extension to the existing protocol structure is only needed for base stations that are "beamforming capable". This is known in the RNC due to the cell portion entities available in the conventional cell creation command.

Figure 9:
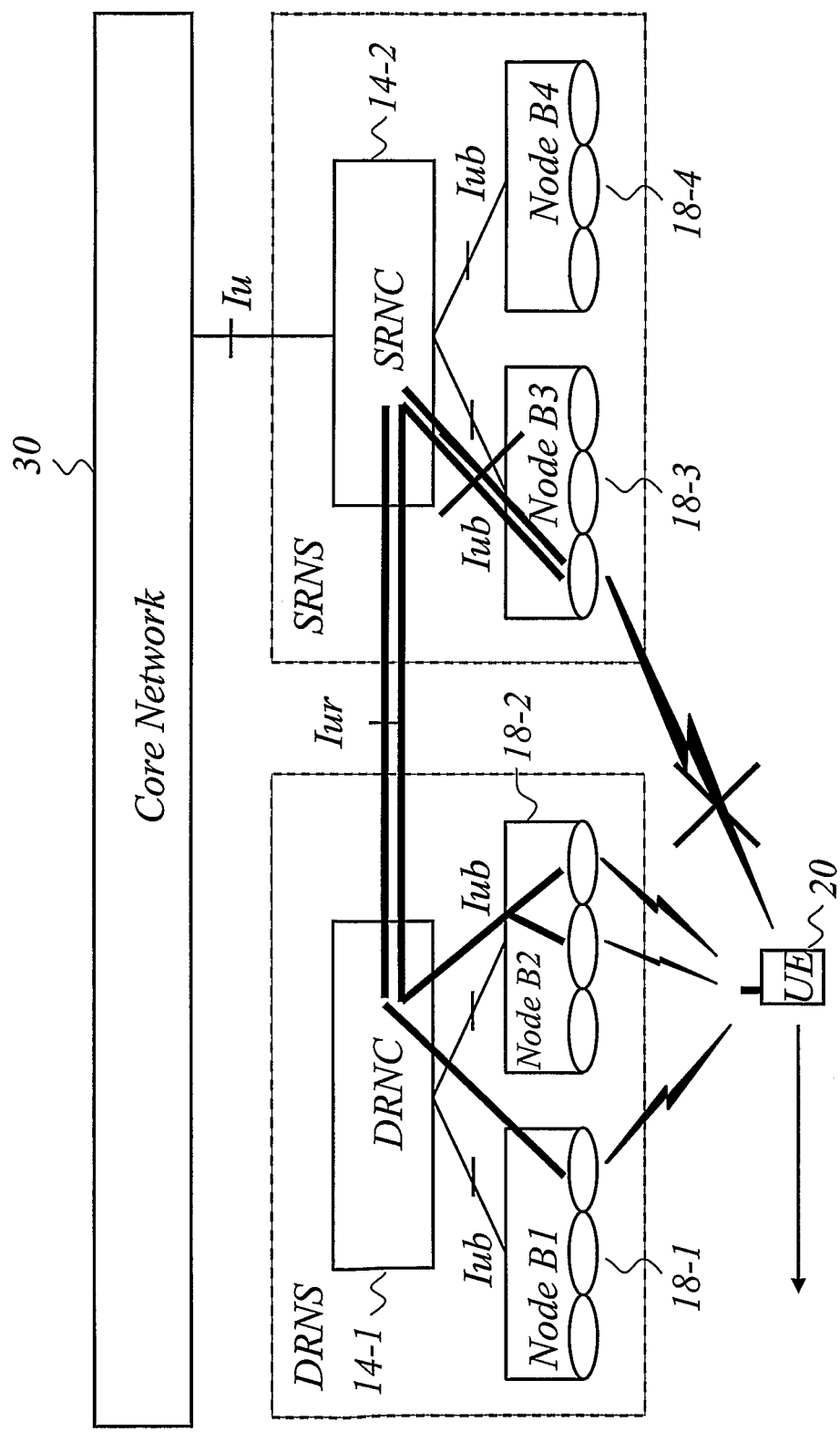
FIG. 9 is a schematic exemplary block diagram illustrating replacement of a radio link.

Note that similar problem as stated above can be found in the case when one radio link should be replaced with another i.e. when a "RADIO LINK ADDITION REQUEST" and a "RADIO LINK DELETION REQUEST" is performed. FIG. 9 schematically illustrates the replacement of a radio link. Here, the radio link to "NodeB 3" is replaced by a radio link to/from "NodeB 1". Similar protocols as in the previous example (see FIGS. 6-8) are used here. In addition to adding a new radio link, the old radio link is removed. Also in this case, the RNC should be informed onto which cell portion, "beam", the new radio link should be established in the "new" NodeB.

For a better understanding of the invention, a typical trace of an exemplary command suite is shown below.

SHO Trace listing

| Time | UE | RBS | RNC1 | RNC2 | CN | Prot | Message | Parameters |
|---|---|---|---|---|---|---|---|---|
| [14:31:32.930] | >>------> | | | | -1, | (RRC) | measurementReport | pScr 315, 235, 291, 292, \| event e1a, 235, |
| [14:31:32.930] | >>------> | | | | -1, | (RRC) | measurementReport | pScr 315, 235, 291, 292, \| event e1a, 235, |
| [14:31:32.932] | | <-----< | | | 250, | (NBAP) | RadioLinkSetupRequestFDD | cRNC.Ctx 0 \| r1-ID 1, \| C-ID 6311, |
| [14:31:32.944] | | >>-----> | | | 250, | (NBAP) | RadioLinkSetupResponseFDD | cRNC.Ctx 168 \| nodB.Ctx 0 \| r1-ID 1, \| r1-Set-ID 0, |
| [14:31:32.948] | <-----< | | | | -1, | (RRC) | activeSetUpdate | r1-Add \| pScr 235, \| sf32 (2) |
| [14:31:33.040] | | >>-----> | | | 250, | (NBAP) | RadioLinkRestoreIndication | cRNC.Ctx 168 \| R1-Set-ID 0 |
| [14:31:33.210] | >>------> | | | | -1, | (RRC) | activeSetUpdateComplete | |
| [14:31:33.208] | >>------> | | | | -1, | (RRC) | activeSetUpdateComplete | |
| [14:31:33.208] | | <-----< | | | 250, | (NBAP) | DedicatedMeasurementInitiationRequest | nodB.Ctx 0 \| mld 1 \| sir-error \| 59, \| 58, |
| [14:31:33.220] | | >>-----> | | | 250, | (NBAP) | DedicatedMeasurementInitiationRequest | cRNC.Ctx 168 \| mld 1 |
| [14:31:33.220] | | <-----< | | | 250, | (NBAP) | DedicatedMeasurementInitiationRequest | nodB.Ctx 0 \| mld 41 \| r1-ID 1 \| transmitted-code-power \| 64, \| 70 |
| [14:31:33.224] | | >>-----> | | | 250, | (NBAP) | DedicatedMeasurementInitiationRequest | cRNC.Ctx 168 \| mld 41 |
| [14:31:33.228] | | <-----< | | | 250, | (NBAP) | DedicatedMeasurementInitiationRequest | nodB.Ctx 0 \| mld 2 \| transmitted-code-power |
| [14:31:33.228] | | >>-----> | | | 250, | (NBAP) | DedicatedMeasurementInitiationResponse | nodB.Ctx 0 \| mld 2 \| transmitted-code-power |
| [14:31:33.232] | | <-----< | | | 250, | (NBAP) | DedicatedMeasurementInitiationResponse | cRNC.Ctx 168 \| mld 2 |
| [14:31:33.236] | | >>-----> | | | 250, | (NBAP) | DedicatedMeasurementInitiationResponse | cRNC.Ctx 140 \| mld 2 |
| [14:31:33.240] | <-----< | | | | -1, | (RRC) | measurementControl | pScr 236, |
| [14:32:06.650] | >>------> | | | | -1, | (RRC) | measurementReport | pScr 235, 315, \| event e1b, 315, |
| [14:32:06.650] | >>------> | | | | -1, | (RRC) | measurementReport | pScr 235, 315, \| event e1b, 315, |
| [14:32:06.652] | <-----< | | | | -1, | (RRC) | activeSetUpdate | r1-Del \| pScr 315, |
| [14:32:06.930] | >>------> | | | | -1, | (RRC) | activeSetUpdateComplete | |
| [14:32:06.928] | >>------> | | | | -1, | (RRC) | activeSetUpdateComplete | |
| [14:32:06.936] | | <-----< | | | 250, | (NBAP) | RadioLinkDeletionRequest | nodB.Ctx 0 \| cRNC.Ctx 140 \| r1-ID 0 |
| [14:32:06.936] | | >>-----> | | | 250, | (NBAP) | RadioLinkDeletionResponse | cRNC.Ctx 140 |
| [14:32:06.940] | | >>-----> | | | 250, | (NBAP) | DedicatedMeasurementTerminationRequest | nodB.Ctx 0 \| mld 2 |
| [14:32:06.944] | <-----< | | | | -1, | (RRC) | measurementControl | |
| [14:32:08.010] | >>------> | | | | -1, | (RRC) | measurementReport | pScr 235, 315, \| event e1d, 235, |
| [14:32:08.010] | >>------> | | | | -1, | (RRC) | measurementReport | pScr 235, |

Figure 10:
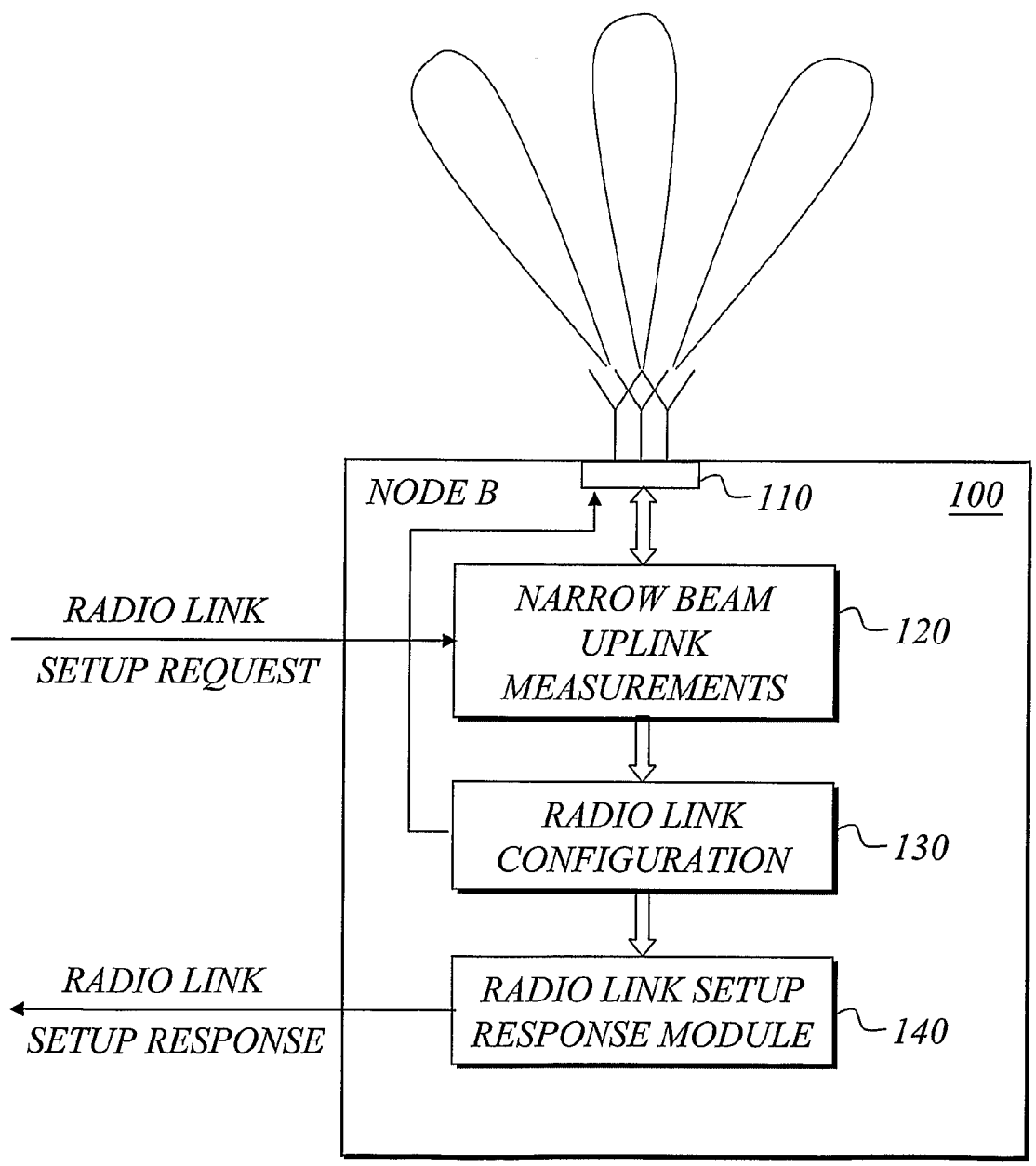
FIG. 10 is a schematic block diagram illustrating relevant parts of a Node B network unit according to an exemplary embodiment of the invention.

FIG. 10 is a schematic block diagram illustrating relevant parts of a Node B network unit according to an exemplary embodiment of the invention. The node B 100 comprises an adaptive antenna transceiver module 110 for enabling narrow beam operation, a narrow beam uplink measurement module 120, a radio link configuration module 130, and a radio link setup response module 140. Once a radio link setup request is received by the Node B from the RNC, the measurement module 120 can initiate uplink measurements for selection of a suitable narrow target beam for the new radio link. The result of the measurements and/or selection of a suitable narrow target beam is/are reported to the radio link configuration module 130, which provides settings for the new serving radio link including target cell and narrow target beam. Information of the selected narrow target beam is also forwarded to the radio link setup response module 140, which preferably appends information representative of narrow target beam in the response message back to the RNC. Information representative of a selected narrow target beam may for example be appended to the response message in a cell portion field such as the S-CPICH field (S-CPICH #X then corresponds to narrow target beam #X).

Figure 11:
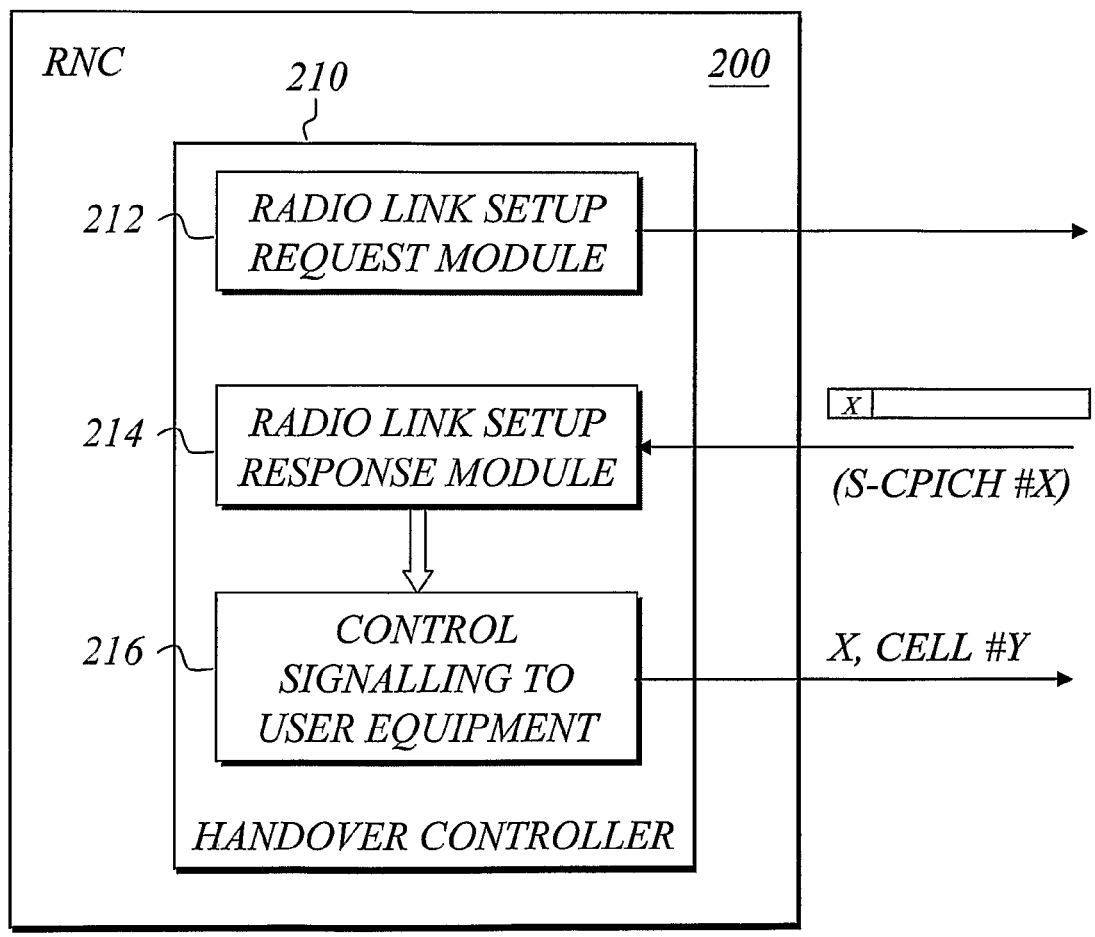
FIG. 11 is a schematic block diagram illustrating relevant parts of a radio network controller according to an exemplary embodiment of the invention.

FIG. 11 is a schematic block diagram illustrating a radio network controller according to an exemplary embodiment of the invention. In general radio network controllers (RNCs) include functionality for radio resource management such as handover control, power control, admission control and packet scheduling, code management and/or macro diversity management. The following description will mainly focus on those components and/or functions that are relevant to the present invention, namely handover and the handover controller in particular. The radio network controller (RNC) 200 includes a handover controller 210, which in turn comprises a radio link setup request module 212, a radio link setup response module 214 and a module 216 for control signaling with the user equipment.

The handover controller 200 also comprises general conventional functionality for detecting the need for setting up a new radio link with another cell. In that process, the handover controller normally use signal quality information related to those cells that are found in the neighbor list of the current active cell set to select a suitable target cell (e.g. #Y).

The handover controller 200 issues a radio link setup request from the radio link setup request module 212 to the Node B that is responsible for the target cell. The handover controller 210 subsequently receives a radio link setup response to the radio link setup response module 214 from the contacted Node B. This response message preferably comprises information representative of a selected narrow target beam, e.g. appended to the response message in a cell portion field such as the S-CPICH field. For example, S-CPICH #X corresponds to narrow target beam (cell portion) #X.

Information of the selected reference signal (S-CPICH #X) and the target cell (#Y) is then typically transferred from the control signaling module 216 to the considered mobile unit/user equipment for enabling appropriate configuration in the mobile unit according to accepted standards.

The advantage of this invention is at least twofold. First, the handover (or creation of a new radio link) can be done directly on a narrow beam. This in contrast to first establish the radio link on a sector covering wide beam and then reconfigure the radio link onto a narrow beam. The conventional procedure is not only power inefficient, but will also lead to increased signaling. This stands in clear contrast to the case when the proposed scheme is used, where the radio link is directly configured onto the high gain power-efficient narrow beam. The scheme proposed by the invention also results in a faster handover since the detour over a sector beam is avoided.

The invention thus allows for handover from/to narrow beam and narrow beam to narrow beam directly without the need to back off and transmit over the entire cell at handover. This will substantially improve the possibility to secure and achieve the system capacity/coverage gains promised by narrow beam (smart antennas/adaptive antennas/fixed beam) techniques.

The embodiments described above are merely given as examples, and it should be understood that the present invention is not limited thereto. Further modifications, changes and improvements which retain the basic underlying principles disclosed herein are within the scope of the invention.

REFERENCES

[1] International Patent Application WO 2005/032200 A2, with international publication date Apr. 7, 2005.
[2] 3GPP standard specification, TS 25.433 Iub interface Node B Application Part (NBAP) signalling.
[3] 3GPP standard specification, TS 25.215 v5.7.0, Physical layer—Measurements (FDD).

The invention claimed is:

1. A method for supporting handover between cells in a cellular radio communication system having adaptive antennas for enabling narrow beam operation, wherein a mobile unit is served by an active cell set of at least one cell in said cellular radio communication system, wherein said method comprises the steps of:

upon a determination, by a network control unit in said cellular communication system, that a new serving radio link in a neighboring cell, for said mobile unit is needed, wherein the determination is based on downlink quality measurements, receiving, by a radio base station, a radio link setup request from the network control unit in said cellular communication system for configuration of the new serving radio link for said mobile unit;

performing, by said radio base station, upon receiving said radio link setup request and before responding to said radio link setup request, uplink measurements with respect to said mobile unit and selecting, based on said uplink measurements, a narrow target beam within the neighboring cell served by said radio base station;

configuring, by said radio base station, said new serving radio link for said mobile unit directly with the selected narrow target beam while said radio link setup request is pending, wherein said radio link setup request is incomplete with respect to the setup of said new serving radio link, and information of the selected narrow target beam constitutes complementary information for setup of said new radio link directly with the selected narrow target beam; and sending, by said radio base station, information representative of the selected narrow target beam to said network control unit in a radio link setup response.

2. The method of claim 1, wherein said information representative of the selected narrow target beam is appended to said radio link setup response by said radio base station.

3. The method of claim 1, wherein information on a cell portion corresponding to the selected narrow target beam is provided in a cell portion field in said radio link setup response.

4. The method of claim 3, wherein said cell portion field is a S-CPICH field.

5. The method of claim 1, wherein said method further comprises a step of said network control unit informing said mobile unit that said new serving radio link is associated with said selected radio base station and with a reference signal related to the selected narrow target beam.

6. The method of claim 1, wherein said method further comprises a step of informing, by said network control unit, said mobile unit that said new serving radio link is associated with said selected radio base station and with said selected narrow target beam.

7. The method of claim 1, wherein said network control unit is one selected from a group consisting of a radio network controller, a mobility server and an access gateway.

8. The method of claim 1, wherein said radio base station is one selected from a group consisting of a radio access node and a Node B.

9. The method of claim 1, wherein said new serving radio link is configured for said mobile unit directly with the selected narrow target beam independent of a cell-wide beam within the neighboring cell.

10. The method of claim 1, wherein said new serving radio link from the neighboring cell is added to an active cell set by the network control unit based on said new serving radio link being configured for said mobile unit directly with the selected narrow target beam.

11. A radio base station in a cellular radio communication system, said-radio base station being operable for serving at least one mobile unit and having adaptive antennas for enabling narrow beam operation, wherein said radio base station comprises:
 a processing circuitry configured to receive a radio link setup request from a network control unit for configuration of a new serving radio link in a neighboring cell for a selected mobile unit, wherein the network control unit has determined that the new serving radio link is needed based on downlink quality measurements;
 the processing circuitry further configured to perform, upon receiving said radio link setup request and before responding to said radio link setup request, uplink measurements with respect to said mobile unit and for selecting, based on said uplink measurements, a narrow target beam within the neighboring cell served by said radio base station;
 the processing circuitry further configured to configure said new serving radio link for said mobile unit directly with the selected narrow target beam while said radio link setup request is pending, wherein said radio link setup request is incomplete with respect to the setup of said new serving radio link, and information of the selected narrow target beam constitutes complementary information for setup of said new radio link directly with the selected narrow target beam; and
 the processing circuitry further configured to send information representative of the selected narrow target beam to said network control unit in a radio link setup response.

12. The radio base station of claim 11, wherein said information representative of the selected narrow target beam is appended to said radio link setup response by the processing circuitry.

13. The radio base station of claim 11, wherein information on a cell portion corresponding to the selected narrow target beam is provided in a cell portion field in said radio link setup response.

14. The radio base station of claim 13, wherein said cell portion field is a S-CPICH field.

15. The radio base station of claim 11, wherein said radio base station is one of a radio access node and a Node B.

16. The radio base station of claim 11, is in combination with a cellular communication network.

17. The radio base station of claim 11, wherein said new serving radio link is configured for said mobile unit directly with the selected narrow target beam independent of a cell-wide beam within the neighboring cell.

18. The radio base station of claim 11, wherein said new serving radio link from the neighboring cell is added to an active cell set by the network control unit based on said new serving radio link being configured for said mobile unit directly with the selected narrow target beam.

19. A network control unit for supporting handover between cells in a cellular radio communication system, said cellular radio communication system having adaptive antennas for enabling narrow beam operation, wherein a mobile unit is served by an active cell set of at least one cell in said cellular radio communication system, wherein said network control unit comprises:
 a processing circuitry configured to send a radio link setup request from the network control unit to a selected radio base station for configuration of a new serving radio link in a neighboring cell for said mobile unit, wherein the network control unit has determined that the new serving radio link is needed based on downlink quality measurements;
 the processing circuitry further configured to receive, in a radio link setup response from said radio base station, information representative of a narrow target beam selected for said new radio link by said radio base station based on uplink measurements with respect to said mobile unit;
 wherein said radio link setup request is incomplete with respect to the setup of said new serving radio link, and information of the selected narrow target beam constitutes complementary information for setup of said new radio link directly with the selected narrow target beam while said radio link setup request is pending with said selected radio base station; and
 the processing circuitry further configured to inform said mobile unit that said new serving radio link is associated with said radio base station and said selected narrow target beam.

20. The network control unit of claim 19, wherein said new serving radio link is configured for said mobile unit directly with the selected narrow target beam independent of a cell-wide beam within the neighboring cell.

* * * * *